United States Patent [19]
Kim et al.

[11] Patent Number: 5,979,265
[45] Date of Patent: Nov. 9, 1999

[54] TILTING AND TELESCOPIC STRUCTURE FOR STEERING COLUMNS

[75] Inventors: Ji-Yeal Kim; Young-Moon Pak; Young-Suk Chong; Byong-Hun Lee, all of Kangwon-Do, Rep. of Korea

[73] Assignee: Mando Machinery Corporation, Kyungki-Do, Rep. of Korea

[21] Appl. No.: 09/048,897

[22] Filed: Mar. 27, 1998

[30] Foreign Application Priority Data

Sep. 11, 1997 [KR] Rep. of Korea ............... 97-46702
Sep. 11, 1997 [KR] Rep. of Korea ............... 97-46703

[51] Int. Cl.$^6$ ..................................................... B62D 1/18
[52] U.S. Cl. ................................................. 74/493; 74/492
[58] Field of Search .............................. 74/491, 492, 493, 74/494, 490.14, 490.15; 280/777, 775

[56] References Cited

U.S. PATENT DOCUMENTS

| | | | |
|---|---|---|---|
| 4,541,298 | 9/1985 | Strutt | 74/493 |
| 4,900,059 | 2/1990 | Kinoshita et al. | 280/775 |
| 5,730,465 | 3/1998 | Barton et al. | 280/775 |
| 5,857,703 | 1/1999 | Kinoshita et al. | 280/775 |

*Primary Examiner*—Thomas R. Hannon
*Assistant Examiner*—David Fenstermacher
*Attorney, Agent, or Firm*—Oblon, Spivak, McClelland, Maier & Neustadt, P.C.

[57] ABSTRACT

A tilting and telescopic structure for steering columns. In the structure, one tilt lever performs the tilting and telescopic function of adjusting the tilting angle and the length of a steering column in accordance with the body size of a driver. In an embodiment, a serrated actuating lever is provided at the telescopic part cooperating with the tilt lever, thus simply operating the tilting and telescopic structure. In another embodiment, the structure has an adjusting nut and bolt cooperating with the tilt lever and has a slit at both the outer tube and the distance bracket, thus being simply operated by controlling the width of the slit by the tilt lever.

3 Claims, 11 Drawing Sheets

TILTING AND TELESCOPIC STRUCTURE FOR STEERING COLUMNS

BACKGROUND OF THE INVENTION

1. Field of the Invention

The present invention relates, in general, to a tilting and telescopic structure for steering columns and, more particularly, to a tilting and telescopic structure with one tilt lever performing the tilting and telescopic function of adjusting the tilting angle and the length of a steering column in accordance with the body size of a driver.

2. Description of the Prior Art

As well known to those skilled in the art, it is preferable to provide steering columns with a means for allowing a driver to selectively adjust the position of a steering column in accordance with his body size, thus allowing the driver to stably and safely handle a steering wheel without having any inconvenience while driving a car. Typical steering columns are thus individually and preferably provided with both a tilting means for the column's angle adjustment and a telescopic means for the column's length adjustment.

FIGS. 1 to 3 show the construction of typical tilting and telescopic structure for steering columns. As shown in the drawings, a typical tilting and telescopic structure has two levers: a tilt lever 100 and a telescopic lever 200 and is operated as follows.

In order to adjust the tilting angle of the steering column, the tilt lever 100 is loosened, allowing the angle of a telescopic tube 400 to be adjustable. After the angle of the tube 400 is adjusted, the tilt lever 100 is fully rotated in a tightening direction, thus fixing the adjusted position of the tube 400.

In order to adjust the length of the steering column, the telescopic lever 200 is rotated in a loosening direction, thus moving two block bodies of a telescopic block 300 in opposite directions. The two block bodies are received in a column housing and are commonly fitted over an actuating screw 500 of the lever 100 in such a manner that they are always moved in opposite directions in accordance with a rotating action of the lever 100. The block bodies in the above state form a gap between the block 300 and the tube 400 and allow the tube 400 to be movable in either direction relative to a driver. It is thus possible to adjust the length of the steering column in accordance with the body size of the driver.

After the column's length is adjusted, the position of the column is fixed by rotating the lever 200 in an opposite direction or a tightening direction. In such a case, the two block bodies of the telescopic block 300 come into frictional contact with the outside surface 401 of the tube 400 at their rounded surfaces 301, thus fixing the tube 400. In the above structure, the actuating screw 500 is fixed to the lever 200 by a nut 600. The column housing is provided with a guide bracket 700 for preventing the block 300 from being unexpectedly separated from the housing.

However, the above tilting and telescopic structure is problematic in that it has two levers respectively performing tilting and telescopic functions, thus having a complex construction and increasing the manufacturing cost of the steering columns.

SUMMARY OF THE INVENTION

Accordingly, the present invention has been made keeping in mind the above problems occurring in the prior art, and an object of the present invention is to provide a tilting and telescopic structure for steering columns, in which a serrated actuating lever is provided at a telescopic part cooperating with a tilt lever, thus simply operating the tilting and telescopic structure.

Another object of the present invention is to provide a tilting and telescopic structure for steering columns, which has an adjusting nut and bolt cooperating with a tilt lever and has a slit at both the outer tube and the distance bracket, thus being simply operated by controlling the width of the slit by the tilt lever.

In an embodiment, the present invention provides a tilting and telescopic structure for steering columns, comprising: a cylindrical outer tube concentrically receiving a steering column shaft and having a perforated hole at its bottom surface; a telescopic tube fitted into the outer tube; a distance bracket externally welded to the bottom surface of the outer tube, thus holding the outer tube, the distance bracket being rounded at its top wall so as to meet a cylindrical configuration of the outer tube and having a slit at a position corresponding to the perforated hole of the outer tube, the distance bracket also having two side walls individually provided with an internally threaded hole; a tilt bracket covering an upper portion of the outer tube, the tilt bracket having two side walls corresponding to the side walls of the distance bracket, thus being closely fitted over the distance bracket with a curved guide slit being formed at both side walls of the tilt bracket, the tilt bracket also having a mount wing at each side and being provided with a fixing capsule at the mount wing, thus being mounted to a chassis; a tension coil spring connected to the distance bracket and the tilt bracket; a telescopic block passing through both the slit of the distance bracket and the perforated hole of the outer tube and being movable in a vertical direction, the telescopic block being smoothly curved and serrated at its bottom surface, thus having a serration surface; and a tilt lever selectively actuating the telescopic block and being actuated by a user when it is necessary to perform a tilting operation or a telescopic operation, the tilt lever having: a serration gear engaging with the serration surface of the telescopic block; two tilt bolts respectively having left and right-hand threads and being integrated with both ends of the serration gear; and a handle integrally and perpendicularly extending from the serration gear.

In another embodiment, the present invention provides a tilting and telescopic structure for steering columns, comprising: a tilt lever selectively actuated by a user when it is necessary to perform a tilting operation or a telescopic operation, the tilt lever having two actuating protrusions; a cylindrical outer tube concentrically receiving a steering column shaft and having a first slit at its bottom surface; a telescopic tube fitted into the outer tube; a distance bracket externally welded to the bottom surface of the outer tube, thus holding the outer tube, the distance bracket being rounded at its top wall so as to meet a cylindrical configuration of the outer tube and having a second slit at a position corresponding to the first slit of the outer tube, the distance bracket also having two side walls individually provided with a hole, one of the two side walls of the distance bracket having a hook, the hook being selectively pushed by one of the two actuating protrusions of the tilt lever, thus moving the distance bracket upwardly or downwardly in accordance with a levering action of the tilt lever; a tilt bracket covering an upper portion of the outer tube, the tilt bracket having two side walls corresponding to the side walls of the distance bracket, thus being closely fitted over the distance bracket with a curved guide slit being formed at both side walls of the tilt bracket, the tilt bracket also having a mount wing at each side and being provided with a fixing capsule at the mount wing, thus being mounted to a chassis; a tension coil spring connected to the distance bracket and the tilt bracket; an adjusting nut externally positioned on one of the two side walls of the tilt bracket; a first adjusting bolt threaded into an outside end of the adjusting nut, with the tilt lever being closely fitted over the adjusting nut and being stopped by the first adjusting bolt; and a second adjusting bolt passing through the two guide slits of the tilt bracket and the two holes of the distance bracket prior to being threaded into an inside end of the adjusting nut, thus being used for controlling a gap between the side walls of the tilt and distance brackets.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
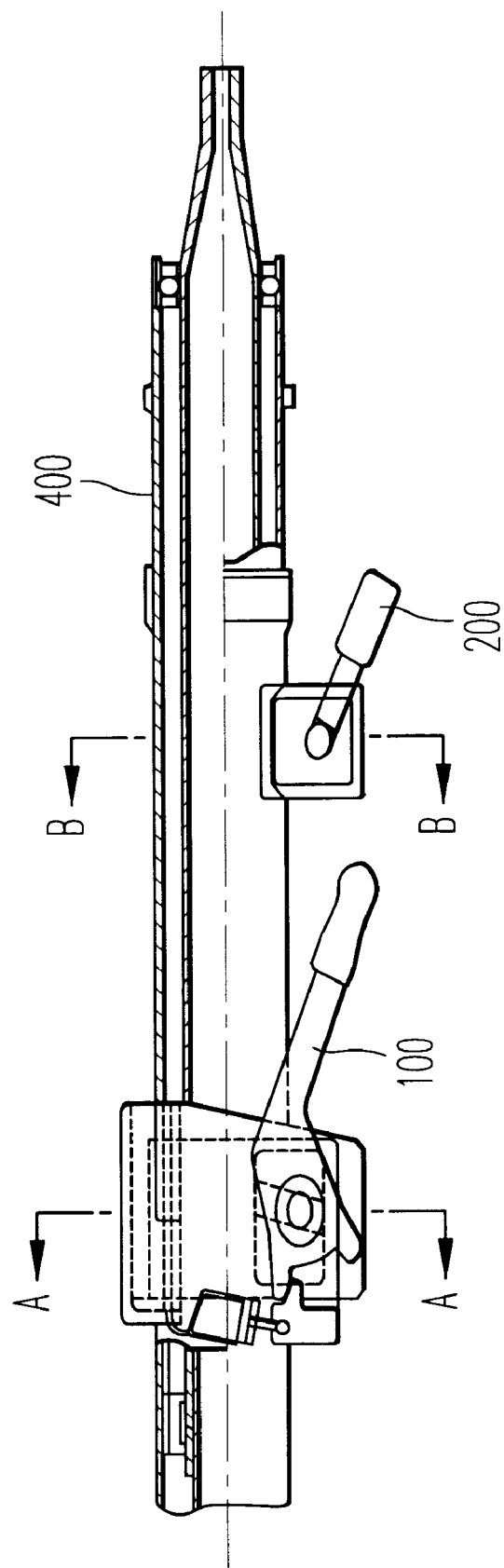
FIG. 1 is a view showing the construction of a typical tilting and telescopic structure for steering columns.
Figure 2:
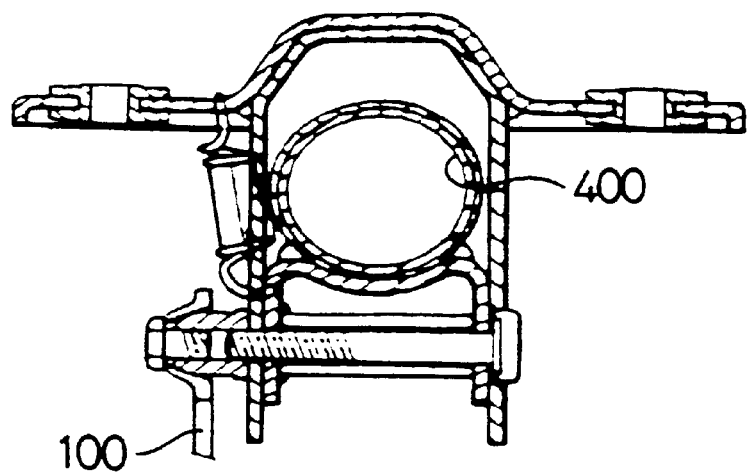
FIG. 2 is a sectional view of the tilting part of the above structure taken along the line A—A of FIG. 1.
Figure 3:
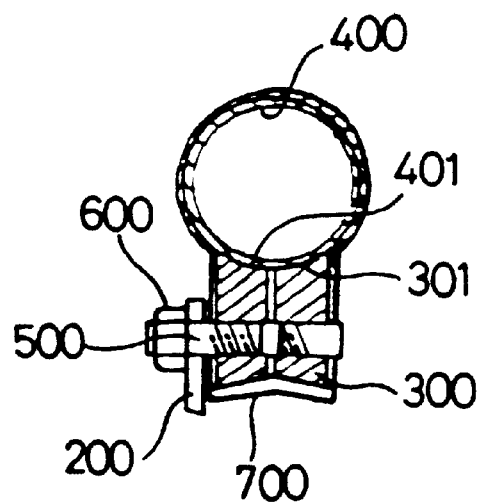
FIG. 3 is a sectional view of the telescopic part of the above structure taken along the line B—B of FIG. 1.
Figure 4:
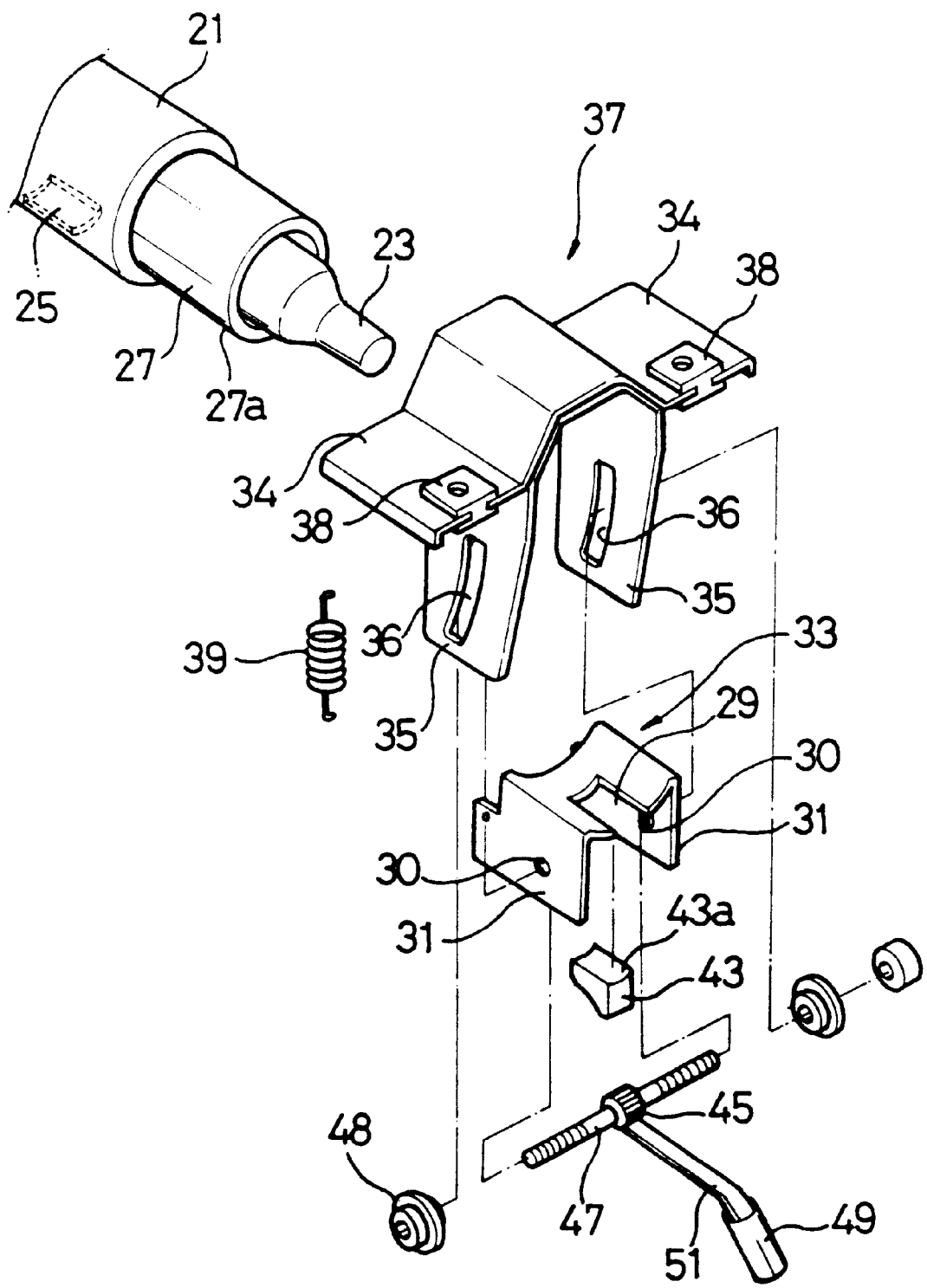
FIG. 4 is an exploded perspective view showing the construction of a tilting and telescopic structure for steering columns in accordance with the primary embodiment of the present invention.
Figure 5:
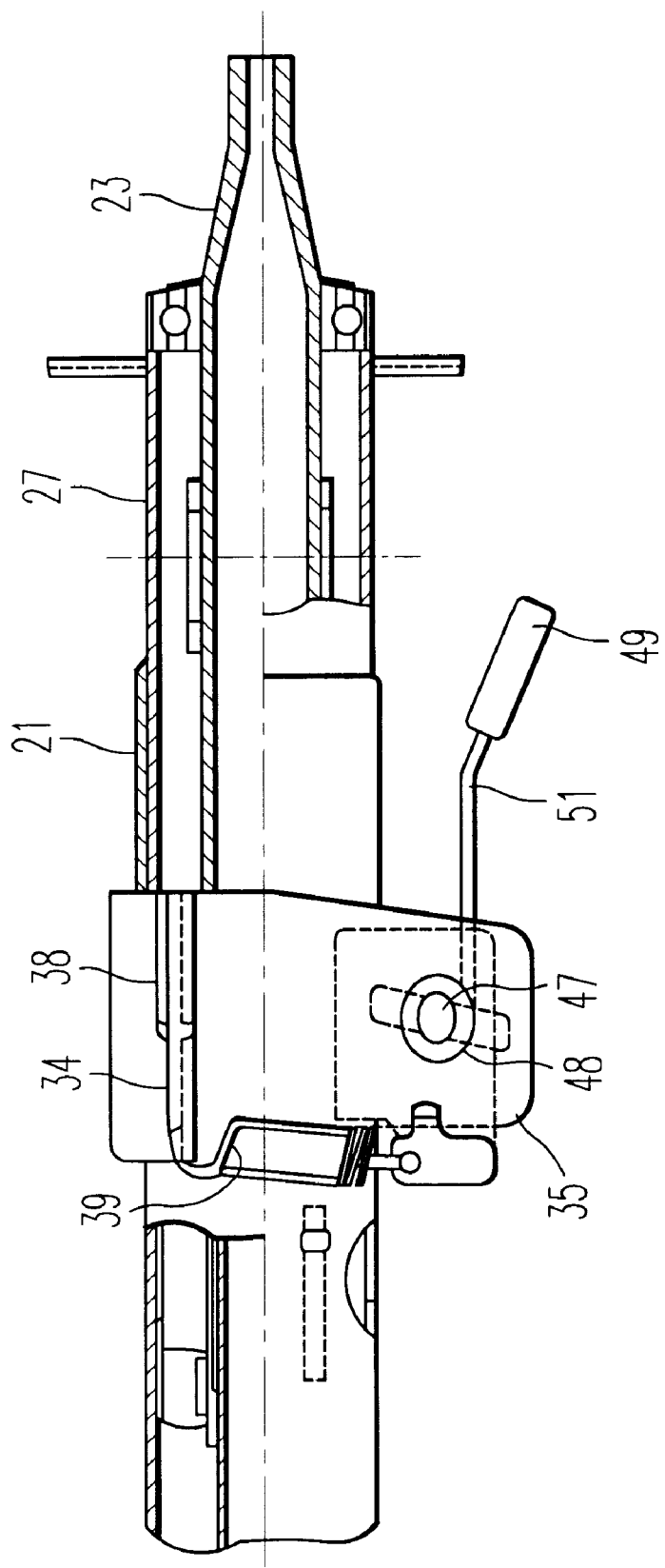
FIG. 5 is a front view of the tilting and telescopic structure of FIG. 4.
Figure 6:
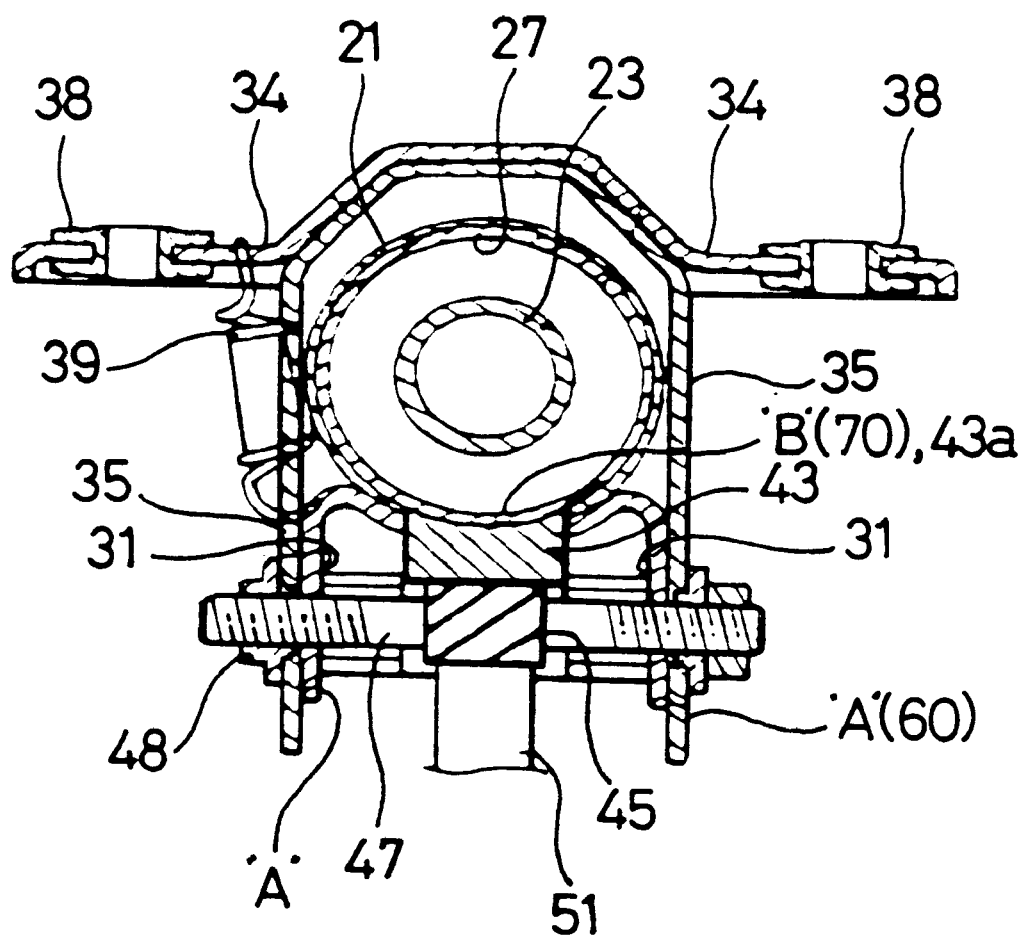
FIG. 6 is a cross sectional view of the tilting and telescopic structure of FIG. 4.
Figure 7:
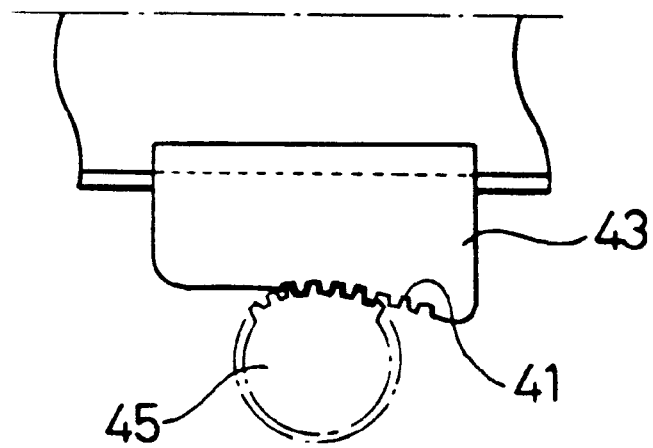
FIG. 7 is a view showing the operation of the tilting and telescopic structure of FIG. 4.
Figure 8:
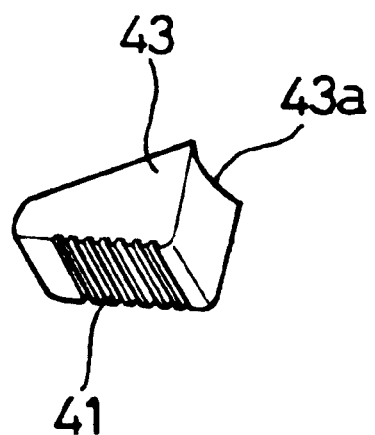
FIG. 8 is a bottom perspective view of a telescopic block included in the tilting and telescopic structure of FIG. 4.

FIG. 4 is an exploded perspective view showing the construction of a tilting and telescopic structure for steering columns in accordance with the primary embodiment of this invention. FIG. 5 is a front view of the above structure. FIG. 6 is a cross sectional view of the above structure. FIG. 7 is a view showing the operation of the above structure. FIG. 8 is a bottom perspective view of a telescopic block included in the above tilting and telescopic structure.

As shown in the drawings, the tilting and telescopic structure according to the primary embodiment comprises a cylindrical outer tube 21, which concentrically receives a steering column shaft 23 and has a perforated hole 25 at its bottom surface. A telescopic tube 27 is fitted into the outer tube 21. The above outer tube 21 is held by a distance bracket 33, which has a reversed U-shaped cross-section and is externally welded to the bottom surface of the above tube 21. The distance bracket 33, which is rounded at its top wall, thus meeting the cylindrical configuration of the tube 21, has a slit 29 at a position corresponding to the perforated hole 25 of the outer tube 21. Each of the two side walls 31 of the above bracket 33 is provided with an internally threaded hole 30. The upper portion of the above tube 21 is covered with a tilt bracket 37, which has two side walls 35 corresponding to the side walls 31 of the distance bracket 33, thus being closely fitted over the distance bracket 33. A curved guide slit 36 is formed at both side walls 35 of the tilt bracket 37. The tilt bracket 37 also has a mount wing 34 at each side. The mount wings 34 are individually provided with a fixing capsule 38 for mounting the tilt bracket 37 to a chassis. A tension coil spring 39 is connected to the two brackets 33 and 37, thus normally biasing the distance bracket 33 upwardly. The tilting and telescopic structure also has a telescopic block 43, which passes through both the slit 29 of the distance bracket 33 and the perforated hole 25 of the outer tube 21 and is movable in a vertical direction. The telescopic block 43 is smoothly curved and serrated at its bottom surface, thus having a serration surface 41 as shown in FIG. 8. The tilting and telescopic structure further includes a tilt lever 51, which engages with the telescopic block 43 and is handled by a user when it is necessary to perform a tilting operation or a telescopic operation. The tilt lever 51 has a serration gear 45 at which the lever 51 engages with the telescopic block 43. Two tilt bolts 47, respectively having left and right-hand threads, are integrated with both ends of the serration gear 45. A handle 49 integrally and perpendicularly extends from the serration gear 45.

In the above tilting and telescopic structure, the serration gear 45 of the tilt lever 51 engages with the serration surface 41 of the telescopic block 43.

In the present invention, the serration gear 45 may be formed by totally or partially serrating the surface of a cylindrical body of the gear 45.

The operational effect of the above tilting and telescopic structure will be described hereinbelow with reference to FIGS. 6 and 7. FIG. 6 is a cross sectional view of the tilting and telescopic structure of FIG. 4. FIG. 7 is a view showing the operation of the tilting and telescopic structure of FIG. 4.

In order to fix the steering column, the tilt lever 51 is rotated in a tightening direction. When the tilt lever 51 is rotated in the tightening direction, the serration gear 45 of the lever 51 moves the telescopic block 43 upwardly, thus causing the rounded top surface 43a of the block 43 to compress and tighten the outer surface 27a of the telescopic tube 27 and fixing the steering column. On the other hand, when the tilt lever 51 is rotated in a loosening direction, the serration gear 45 of the lever 51 moves the telescopic block 43 downwardly. In such a case, a gap is formed between the telescopic block 43 and the telescopic tube 27, thus making the tube 27 free from the block 43 and allowing a user to adjust the length of the tube 27. In a brief description, when the tilt lever 51 is rotated in either direction, two contact points: "A" point (60) and "B" point 70 of the structure are tightened or loosened, thus allowing the user to perform a tilting or telescopic operation.

Figure 9:
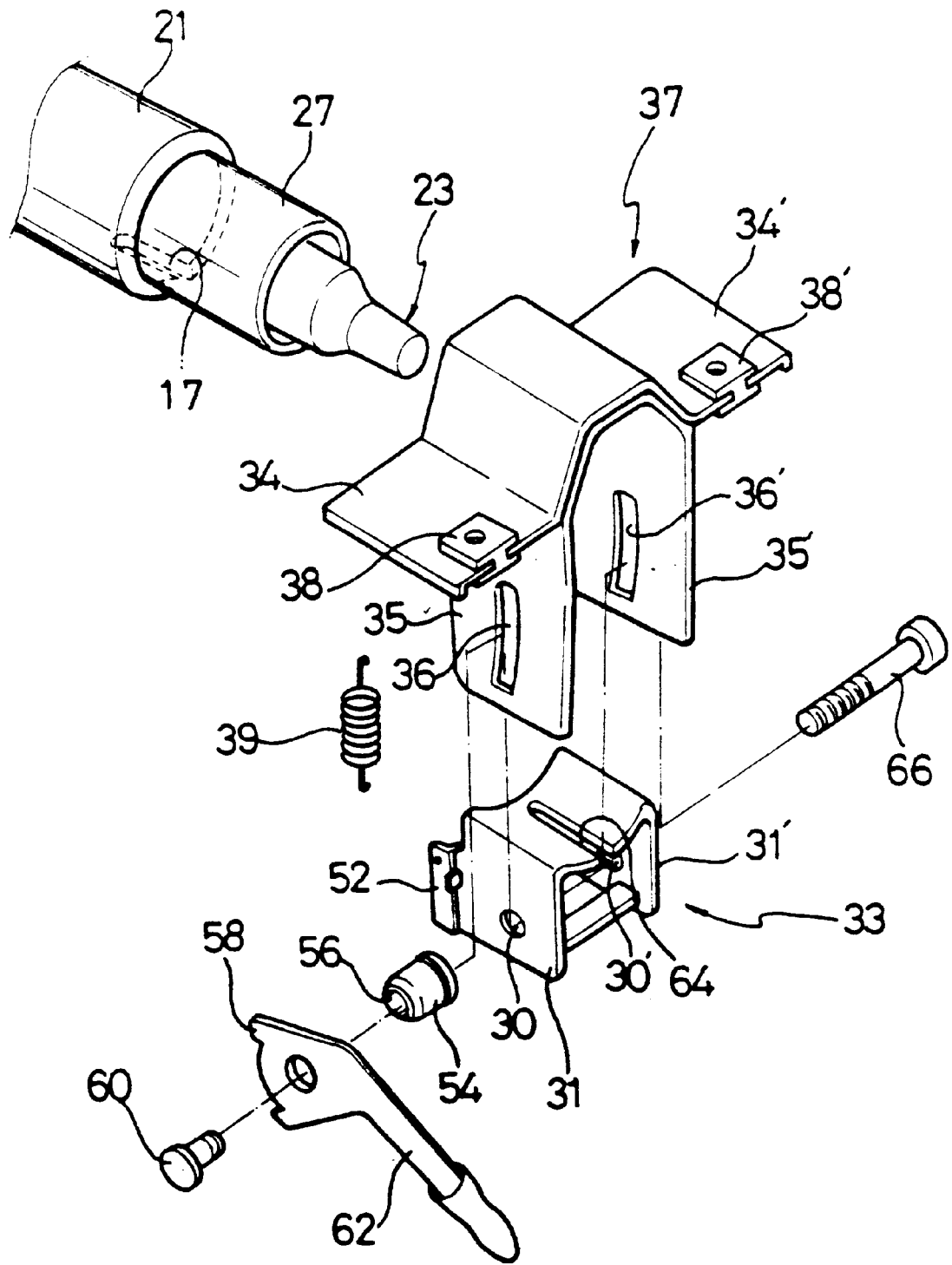
FIG. 9 is an exploded perspective view showing the construction of a tilting and telescopic structure for steering columns in accordance with the second embodiment of the present invention.
Figure 10:
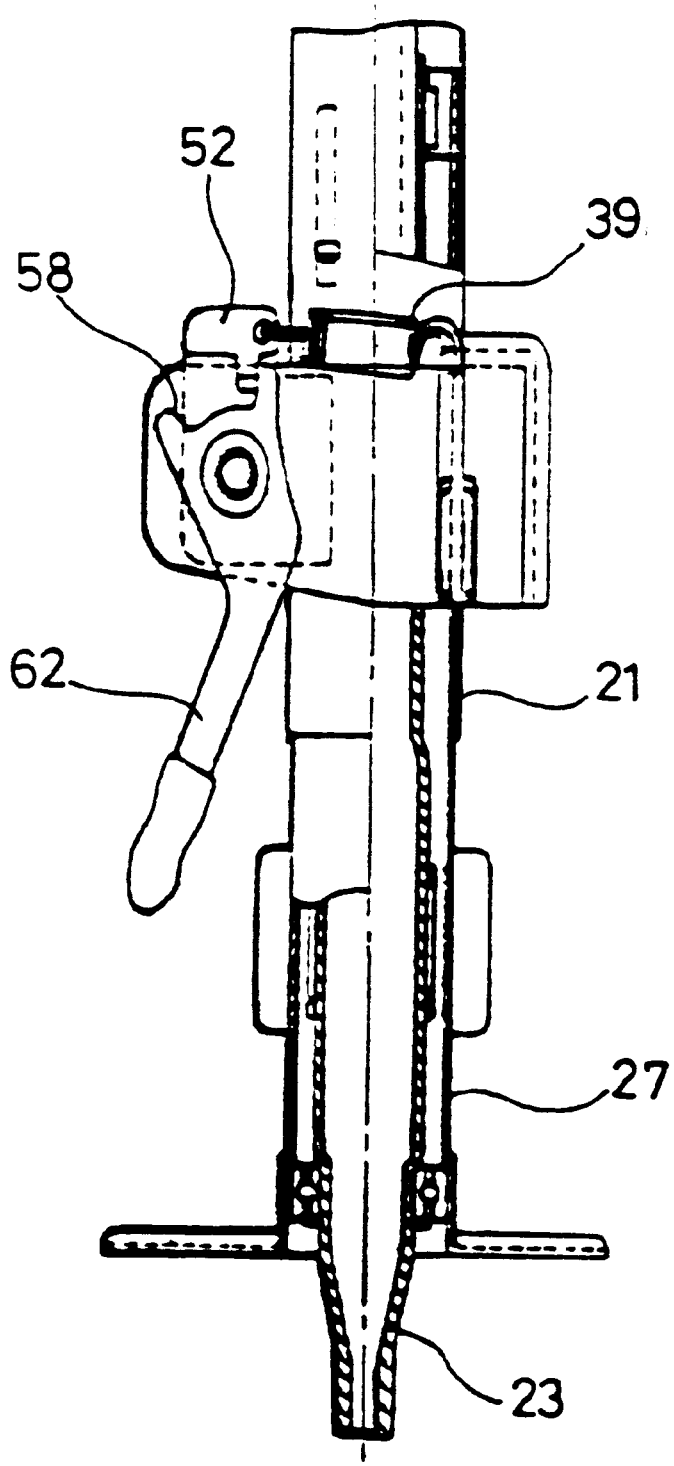
FIG. 10 is a front view of the tilting and telescopic structure of FIG. 9.
Figure 11:
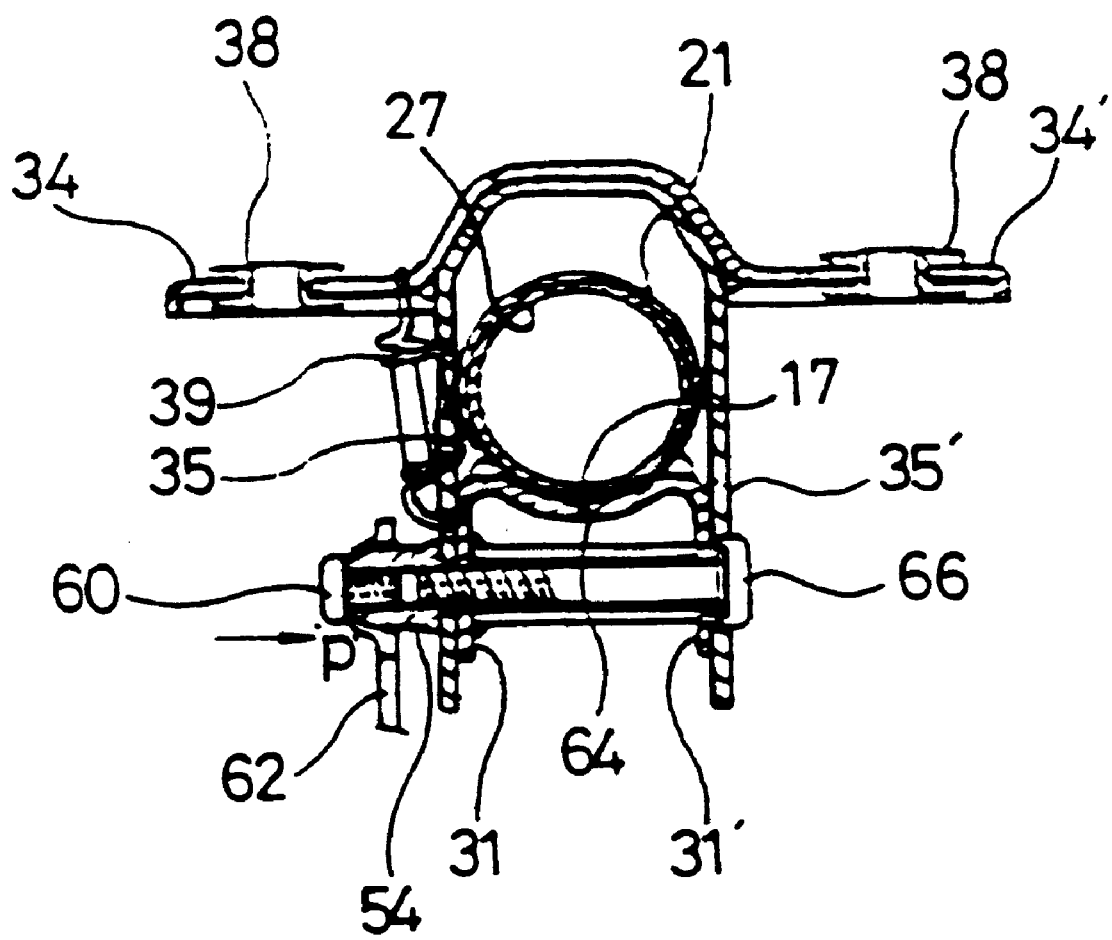
FIG. 11 is a cross sectional view of the tilting and telescopic structure of FIG. 9.

FIG. 9 is an exploded perspective view showing the construction of a tilting and telescopic structure for steering columns in accordance with the second embodiment of this invention. FIGS. 10 and 11 are front and cross sectional views of the tilting and telescopic structure of FIG. 9, respectively.

As shown in the drawings, the tilting and telescopic structure according to the second embodiment comprises a tilt lever 62, which is handled by a user when it is necessary to perform a tilting operation or a telescopic operation. A cylindrical outer tube 21 concentrically receives a steering column shaft 23 and has a longitudinal slit 17 at its bottom surface. A telescopic tube 27 is fitted into the outer tube 21 with a cylindrical gap being defined between the shaft 23 and the telescopic tube 27. The above outer tube 21 is held by a distance bracket 33, which has a reversed U-shaped cross-section and is externally welded to the bottom surface of the above tube 21. The distance bracket 33, which is rounded at its top wall, thus meeting the cylindrical configuration of the tube 21, has a slit 64 at a position corresponding to the longitudinal slit 17 of the outer tube 21. Each of the two side walls 31 of the above bracket 33 is provided with a hole 30. One side wall 31 of the distance bracket 33 has a hook 52, which is selectively pushed by one of two actuating protrusions 58 of the tilt lever 62, thus moving the distance bracket 33 upwardly or downwardly in accordance with a rotating direction of the lever 62. The upper portion of the above tube 21 is covered with a tilt bracket 37, which has two side walls 35 corresponding to the side walls 31 of the distance bracket 33, thus being closely fitted over the distance bracket 33. A curved guide slit 36 is formed at both side walls 35 of the tilt bracket 37. The tilt bracket 37 also has a mount wing 34 at each side. The mount wings 34 are individually provided with a fixing capsule 38 for mounting the tilt bracket 37 to a chassis. A tension coil spring 39 is connected to the two brackets 33 and 37, thus normally biasing the distance bracket 33 upwardly. The tilting and telescopic structure also has one adjusting nut 54 and two adjusting bolts 60 and 66. The adjusting nut 54 has an internal thread 56 and is mounted to one side wall 35 of the tilt bracket 37. The first adjusting bolt 60 is threaded into one end or the outside end of the adjusting nut 54, with the tilt lever 62 being closely fitted over the nut 54 and being stopped by the bolt 60. The second adjusting bolt 66 passes through the two holes 30 and the two slits 36 prior to being threaded into the other end or the inside end of the nut 54, thus integrating the two brackets 33 and 37, the tilt lever 62, the adjusting nut 54 and the first adjusting bolt 60 into a single body. The above second bolt 66 is used for controlling the gap between the side walls of the two brackets 33 and 37.

Figure 12A:
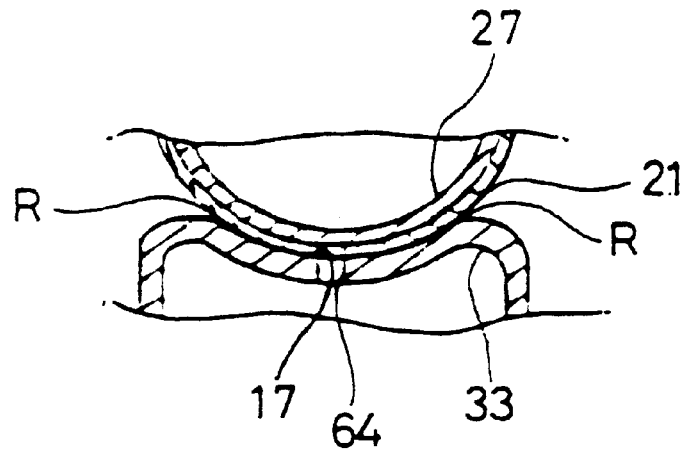
FIG. 12a is a sectional view showing the tilting and telescopic structure of FIG. 9 in a pre-operational position.
Figure 12B:
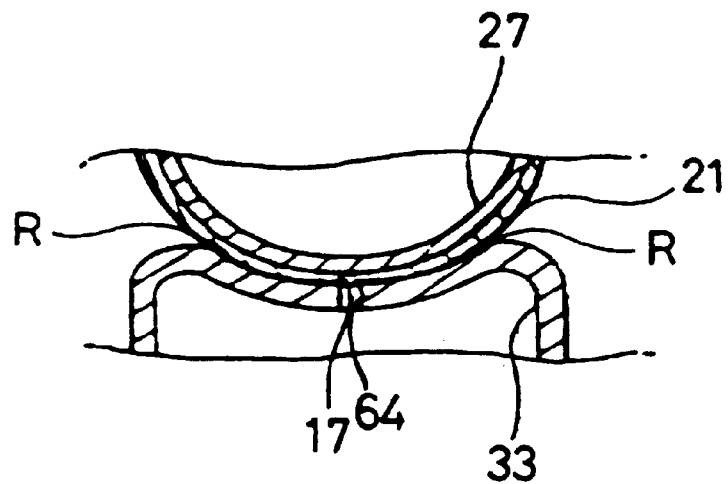
FIG. 12b is a sectional view showing the tilting and telescopic structure of FIG. 9 in a post-operational position.

The operational effect of the above tilting and telescopic structure will be described hereinbelow with reference to FIGS. 12a and 12b. FIG. 12a is a sectional view showing the tilting and telescopic structure of FIG. 9 in a pre-operational position. FIG. 12b is a sectional view showing the tilting and telescopic structure of FIG. 9 in a post-operational position. As shown in the drawings, the above structure is operated by the frictional force between the distance bracket 33 and the tilt bracket 37. When the tilt lever 62 is rotated in a tightening direction, the adjusting nut 54 moves to a direction "P", thus bringing both side walls 35 of the tilt bracket 37 into close contact with both side walls 31 of the distance bracket 33 and fixing the distance bracket 33 to the tilt bracket 37. In the above case, the slitted top wall of the distance bracket 33 compresses the slitted bottom surface of the outer tube 21 upwardly, thereby reducing the width of the slit 17 and reducing the diameter of the outer tube 21. The outer tube 21 thus compresses the telescopic tube 27, fixing a steering column. On the other hand, when the tilt lever 62 is rotated in a loosening direction, the adjusting nut 54 is rotated in a direction opposite to the direction "P", thus forming a gap between both side walls 31 of the distance bracket 33 and both side walls 35 of the tilt bracket 37. The steering column in the above state is movable upwardly or downwardly and so it is possible to tilt the steering column as desired. In addition, both side walls 31 of the distance bracket 33 move in a direction opposite to the direction "P", thus spacing the distance bracket 33 from the outer tube 21 at the rounded portions "R" with a gap being formed at both rounded portions "R". Therefore, the steering column or the telescopic tube 27 is movable relative to the outer tube 21 in opposite directions and so it is possible to adjust the length of the steering column.

In a brief description, the slitted outer tube 21 is selectively compressed by or released from the slitted distance bracket 33 in accordance with a levering action of the tilt lever 62. It is thus possible to adjust the tilting angle of the telescopic tube 27 or the steering column. Such a levering action of the tilt lever 62 also causes both side walls 31 of the distance bracket 33 to be brought into close contact with or released from both side walls 35 of the tilt bracket. Therefore, it is possible to adjust the length of the telescopic tube 27 or the steering column. The operational effect of the tilting and telescopic structure according to the second embodiment is determined by both the length and width of the two slits 17 and 64. The tilting and telescopic structure according to the second embodiment has a simple construction since it is operated by the two slits 17 and 64.

Figure 13A:
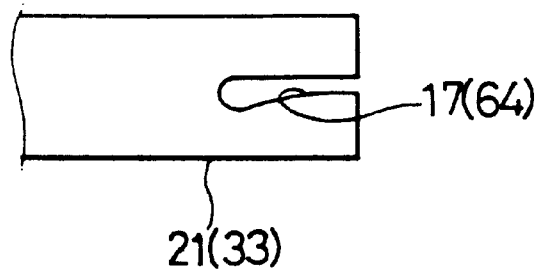
FIG. 13a is a view showing the configuration of an embodiment of the slit formed at both an outer tube and a distance bracket of the tilting and telescopic structure of FIG. 9.
Figure 13B:
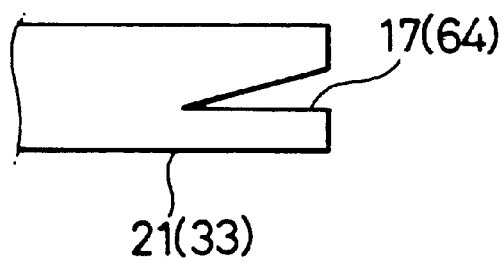
FIG. 13b is a view showing the configuration of another embodiment of the slit formed at both the outer tube and the distance bracket of the tilting and telescopic structure of FIG. 9.
Figure 13C:
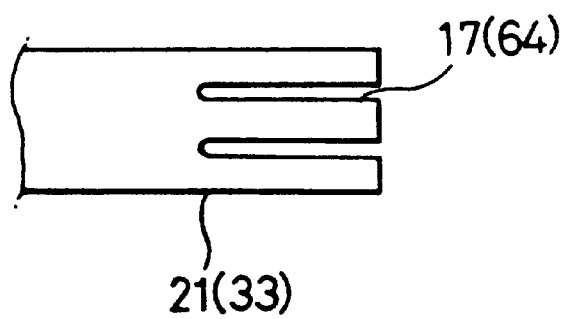
FIG. 13c is a view showing the configuration of a further embodiment of the slit formed at both the outer tube and the distance bracket of the tilting and telescopic structure of FIG. 9.

FIG. 13a is a view showing the configuration of an embodiment of the slit 17, 64 formed at both the outer tube 21 and the distance bracket 33 of FIG. 9. In the embodiment of FIG. 13a, the slit 17, 64 has an enlarged width and a rounded web. FIG. 13b is a view showing the configuration of another embodiment of the slit 17, 64. In the embodiment of FIG. 13b, the slit 17, 64 has a reduced width and a sharpened web. FIG. 13c is a view showing the configuration of a further embodiment of the slit 17, 64. In the embodiment of FIG. 13c, two linear and parallel slits 17, 64 are formed at both the outer tube 21 and the distance bracket 33.

As described above, the present invention provides a tilting and telescopic structure for steering columns. In an embodiment, a serrated actuating lever is provided at the telescopic part cooperating with a tilt lever, thus simply operating the tilting and telescopic structure.

In another embodiment, the tilting and telescopic structure has an adjusting nut and bolt cooperating with a tilt lever and has a slit at both the outer tube and the distance bracket, thus being simply operated by controlling the width of the slit by the tilt lever.

The tilting and telescopic structure of this invention has a simple construction and is manufactured at low cost. Another advantage of the structure resides in that it has a desired natural frequency and has an easy tolerance control.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tilting and telescopic structure for steering columns, comprising:

a cylindrical outer tube concentrically receiving a steering column shaft and having a perforated hole at its bottom surface;

a telescopic tube fitted into said outer tube;

a distance bracket externally welded to the bottom surface of said outer tube, thus holding the outer tube, said distance bracket being rounded at its top wall so as to meet a cylindrical configuration of the outer tube and having a slit at a position corresponding to the perforated hole of the outer tube, said distance bracket also having two side walls individually provided with an internally threaded hole;

a tilt bracket covering an upper portion of the outer tube, said tilt bracket having two side walls corresponding to the side walls of the distance bracket, thus being closely fitted over the distance bracket with a curved guide slit being formed at both side walls of the tilt bracket, said tilt bracket also having a mount wing at each side and being provided with a fixing capsule at said mount wing, thus being mounted to a chassis;

a tension coil spring connected to said distance bracket and said tilt bracket;

a telescopic block passing through both the slit of the distance bracket and the perforated hole of the outer tube and being movable in a vertical direction, said telescopic block being smoothly curved and serrated at its bottom surface, thus having a serration surface; and a tilt lever selectively actuating the telescopic block and being actuated by a user when it is necessary to perform a tilting operation or a telescopic operation, said tilt lever having:

a serration gear engaging with the serration surface of the telescopic block;

two tilt bolts respectively having left and right-hand threads and being integrated with both ends of said serration gear; and a handle integrally and perpendicularly extending from the serration gear.

2. The tilting and telescopic structure according to claim 1, wherein the rounded top wall of the telescopic block selectively comes into frictional contact with or is released from the rounded bottom surface of the outer tube by a levering action of the tilt lever, thus allowing the length of the telescopic tube to be adjustable.

3. The tilting and telescopic structure according to claim 1, wherein said serration gear is formed by totally or partially serrating a cylindrical surface of the gear, thus corresponding to the serration surface of the telescopic block.

* * * * *